(12) United States Patent
Albrecht et al.

(10) Patent No.: US 10,665,181 B2
(45) Date of Patent: May 26, 2020

(54) BACKLIGHTS WITH DYNAMIC DIMMING RANGES

(71) Applicant: Apple Inc., Cupertino, CA (US)

(72) Inventors: Marc Albrecht, San Francisco, CA (US); Teun R. Baar, San Francisco, CA (US); Nicolas P. Bonnier, Campbell, CA (US); Sean Chang, Mountain View, CA (US); ByoungSuk Kim, Palo Alto, CA (US); David S. Zalatimo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/907,097

(22) Filed: Feb. 27, 2018

(65) Prior Publication Data
US 2019/0005898 A1    Jan. 3, 2019

Related U.S. Application Data

(60) Provisional application No. 62/526,276, filed on Jun. 28, 2017.

(51) Int. Cl.
*G06F 1/16*    (2006.01)
*G09G 3/34*    (2006.01)

(52) U.S. Cl.
CPC ......... *G09G 3/3426* (2013.01); *G06F 1/1643* (2013.01); *G09G 2320/0285* (2013.01); *G09G 2320/064* (2013.01); *G09G 2320/0606* (2013.01); *G09G 2320/0626* (2013.01); *G09G 2320/0633* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 8,339,067 B2 | 12/2012 | Lin et al. | |
| 9,271,351 B2 | 2/2016 | Stockstad et al. | |
| 2003/0214242 A1 | 11/2003 | Berg-Johansen | |
| 2014/0285511 A1* | 9/2014 | Hoshino | G09G 5/10 345/590 |
| 2015/0123955 A1 | 5/2015 | Bi | |
| 2016/0113085 A1 | 4/2016 | Vannanen | |
| 2018/0132346 A1 | 5/2018 | Yamano et al. | |

* cited by examiner

*Primary Examiner* — Kent W Chang
*Assistant Examiner* — Benjamin Morales
(74) *Attorney, Agent, or Firm* — Treyz Law Group, P.C.; Kendall W. Abbasi

(57) ABSTRACT

An electronic device may be provided with a display. The display may include a backlight having an array of locally dimmable light sources. Control circuitry may provide control signals to the backlight to produce light at different brightness levels. When the brightness level is below a threshold, the control circuitry may use pulse-width-modulation control signals to control the light sources in the backlight. When the brightness level is above the brightness threshold, the control circuitry may use analog control signals to control the light sources in the backlight. The control circuitry may adjust the threshold to achieve different dimming ranges for different brightness settings. A low brightness setting, for example, may have a lower threshold and lower dimming range than a high brightness setting, which may help produce darker darks when the display operates in a low brightness setting.

20 Claims, 9 Drawing Sheets

| DISPLAY BRIGHTNESS SETTING | KNEE POINT |
|---|---|
| 0 | KP(0) |
| 1 | KP(1) |
| ⋮ | ⋮ |
| N | KP(N) |

*FIG. 11*

BACKLIGHTS WITH DYNAMIC DIMMING RANGES

This application claims the benefit of provisional patent application No. 62/526,276, filed Jun. 28, 2017, which is hereby incorporated by reference herein in its entirety.

BACKGROUND

This relates generally to electronic devices, and, more particularly, to electronic devices with displays.

Electronic devices often include displays. If care is not taken, displays may be damaged by displaying bright content for prolonged periods of time, dark colors in images may appear washed out, displays may be operated with brightness levels that consume excessive power, user preferences may not be taken into account when adjusting display brightness, and displayed content may exhibit visible artifacts. Addressing these concerns while displaying content with a pleasing appearance is challenging.

SUMMARY

An electronic device may be provided with a display. Control circuitry in the electronic device may operate the display at different brightness settings. System brightness settings may be user-defined brightness settings, brightness levels set by the electronic device to accommodate a normal power operating mode and a low-power operating mode, brightness settings to account for ambient conditions, or brightness settings based on a combination of these factors.

The display may include a backlight having an array of locally dimmable light sources. The control circuitry may provide control signals to the backlight to produce light at different brightness levels. Some light sources in the array may be dimmed to make dark portions of an image appear even darker, while other light sources in the array may be bright to illuminate specular highlights in an image. When the brightness level for a light source is below a threshold, the control circuitry may use pulse-width-modulation control signals to control that light source. When the brightness level for a light source is above the brightness threshold, the control circuitry may use analog control signals to control that light source. The control circuitry may adjust the brightness threshold to achieve different dimming ranges. A lower threshold may result in a lower and shorter range of luminance values to achieve even darker darks, while a higher threshold may result in a higher and larger range of luminance values to achieve brighter highlights.

The control circuitry may determine a brightness threshold for determining which dimming scheme (analog dimming or pulse-width-modulation dimming) to use based on a current brightness setting. A low brightness setting, for example, may have a lower threshold and lower minimum brightness levels than a high brightness setting, which may help produce darker darks when the display operates in a low brightness setting.

When the control circuitry receives a change in brightness setting, the control circuitry may compare the change with a hysteresis threshold so that the brightness threshold for determining which dimming scheme to use is only adjusted when the brightness setting change exceeds the hysteresis threshold. The control circuitry may also apply a temporal filter to gradually adjust the brightness threshold over time.

BRIEF DESCRIPTION OF THE DRAWINGS

FIG. 11 is a look-up table showing how a knee point may be selected based on a display brightness setting in accordance with an embodiment.

DETAILED DESCRIPTION

Figure 1:
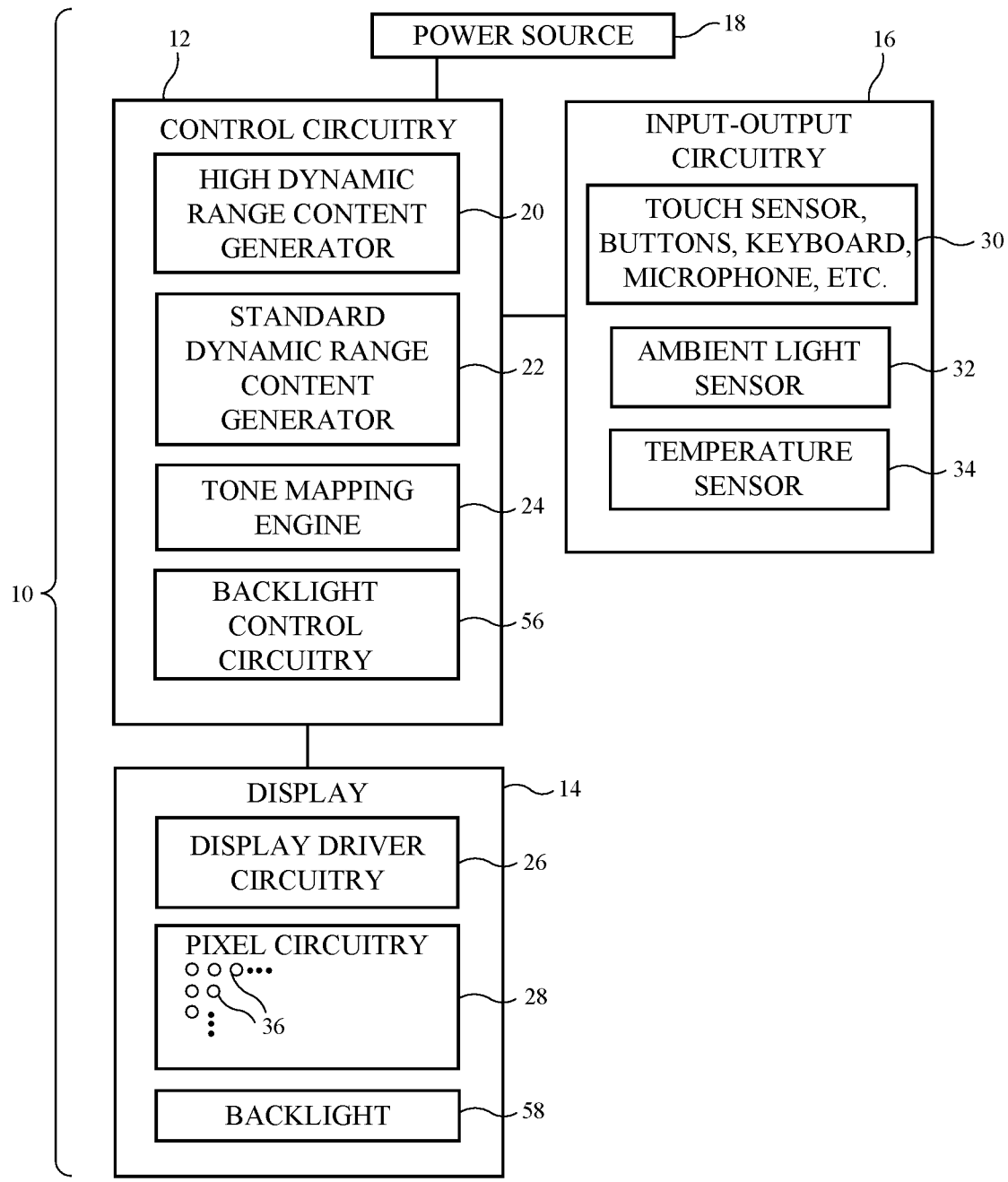
FIG. 1 is a schematic diagram of an illustrative electronic device having a display in accordance with an embodiment.

An illustrative electronic device of the type that may be provided with a display is shown in FIG. 1. As shown in FIG. 1, electronic device 10 may have control circuitry 12. Control circuitry 12 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application-specific integrated circuits, graphics processing units, display driver circuitry such as timing controller integrated circuits and other display driver integrated circuits, and other control circuitry.

Control circuitry 12 is configured to execute instructions for implementing desired control and communications features in device 10. For example, control circuitry 12 may be used in determining pixel luminance levels that are to be used in displaying content for a user. Pixel luminance levels may be based, for example, on ambient light conditions, user-adjusted display brightness settings, statistical information associated with content that is being displayed, and display characteristics. Control circuitry 12 may be configured to perform these operations using hardware (e.g., dedicated hardware such as integrated circuits and thin-film circuits) and/or software (e.g., code that runs on control circuitry 12). Software code for performing control and communications operations for device 10 may be stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 12 during operation of device 10.

Input-output circuitry 16 in device 10 may be used to allow data to be supplied to device 10 from a user or external equipment, may be used to gather environmental data, and may be used to supply data to external equipment and output for a user. Input-output circuitry 16 may include input-output devices 30 such as buttons, joysticks, scrolling wheels, touch pads, key pads, keyboards, microphones, speakers, tone generators, vibrators, cameras, sensors, light-emitting diodes and other status indicators, touch sensitive displays (e.g., touch sensors overlapping pixel arrays in displays), data ports, etc. As shown in FIG. 1, input-output circuitry 16 may include a color ambient light sensor or other ambient light sensor 32 for gathering ambient light measurements (e.g., ambient light levels such as ambient light luminance measurements and/or ambient light color measurements such as color temperature measurements and/or color coordinate measurements). Input-output circuitry 16 may also include temperature sensor circuitry such as one or more temperature sensors. Temperature sensors such as temperature sensor 34 may be used to gather real time information on the operating temperature of device 10 and display(s) associated with device 10.

Power may be supplied to control circuitry 12 and other resources in device 10 using one or more power sources such as power source 18. Power source 18 may be an alternating-current (AC) source such as a wall outlet (mains supply) and/or a direct-current (DC) source such as a battery. During operation, control circuitry 12 can detect whether power is being received from an AC or DC source and can monitor the charge state of the battery.

Device 10 may include one or more internal and/or one or more external displays such as illustrative display 14. Display 14 may be mounted in a common housing with device 10 (e.g., when device 10 is a mobile device such as a cellular telephone, wristwatch device, tablet computer, or laptop computer or when device 10 is an all-in-one device such as a television or desktop computer). In other configurations, display 14 may be coupled to device 10 wirelessly or with a cable (e.g., when device 10 is a desktop computer or a set-top box).

In general, device 10 may be any suitable type of device. Device 10 may, for example, be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Device 10 (e.g., a portable device) may be exposed to a variety of environmental conditions. For example, ambient light levels and therefore display glare may vary as a portable device is moved between indoors and outdoors environments (as an example).

Electronic device may have a housing. The housing, which may sometimes be referred to as an enclosure or case, may be formed of plastic, glass, ceramics, fiber composites, metal (e.g., stainless steel, aluminum, etc.), other suitable materials, or a combination of any two or more of these materials. The housing may be formed using a unibody configuration in which some or all of the housing is machined or molded as a single structure or may be formed using multiple structures (e.g., an internal frame structure, one or more structures that form exterior housing surfaces, etc.). In laptop computers and other foldable devices, a first portion of the housing may rotate relative to a second portion of the housing (e.g., a display housing in a laptop computer may rotated about a hinge axis relative to a base housing in the laptop computer).

Display 14 may be mounted in the housing. Display 14 may have a rectangular outline and be surrounded by four peripheral edges, may have a shape that is circular or oval, or may have other suitable outlines. Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may have an array 28 of pixels 36 for displaying images for a user (e.g., video, graphics, text, etc.). Display driver circuitry 26 (e.g., thin-film transistor circuitry on display 14 and/or one or more timing-controller integrated circuits and/or other display driver integrated circuits) may be used to display images on pixel array 28. Pixel array 28 may include, for example, hundreds or thousands of rows and hundreds or thousands of columns of pixels 36. To display color images, each pixel 36 may include subpixels of different colors. For example, each pixel 36 may include, red, green, and blue subpixels or subpixels of different colors. By varying the relative intensity of light emitted by each subpixel in a pixel, pixel output color can be adjusted. The color cast (white point) of each pixel can be adjusted by modifying the gain associated with each subpixel.

The pixel array of display 14 may be formed from liquid crystal display (LCD) components, an array of electrophoretic display pixels, an array of plasma display pixels, an array of organic light-emitting diode pixels or other light-emitting diodes, an array of electrowetting display pixels, or pixels based on other display technologies.

Display 14 may be backlit with an array of locally dimmable light-emitting diodes or other suitable backlight structures in backlight 58. Backlight control circuitry 56 may control the brightness of backlight 58 by issuing backlight control commands to the light sources in backlight 58. If desired, backlight control circuitry 56 may be formed as part of display driver circuitry 26 or may be separate from display driver circuitry 26. Overall pixel brightness may be controlled by adjusting pixel transmission (e.g., by adjusting liquid crystal pixel transmission values provided to pixels 36) and/or by adjusting backlight output (by adjusting the brightness of backlight 58).

It may be desirable to operate backlight 58 using different dimming schemes. For example, backlight control circuitry 56 may control backlight 58 (e.g., the light sources in backlight 58) using an analog dimming scheme or a digital (e.g., pulse-width-modulation) dimming scheme. Backlight control circuitry 56 may determine which dimming scheme to use based on the desired backlight brightness. For example, backlight 58 may be operated using an analog dimming scheme for brightness levels above a threshold, whereas a pulse-width-modulation (PWM) dimming scheme may be used for brightness levels below a threshold. If desired, the threshold brightness at which control circuitry 56 changes dimming schemes (sometimes referred to as a knee point or threshold) may be dynamically adjusted based on a current operating state of the display. Low system brightness levels, for example, may use a lower threshold than high system brightness levels. Because a lower threshold may allow a light source in backlight 58 to achieve a lower range of luminance levels, reducing the threshold for low system brightness levels may help avoid washed out darks in images.

Display 14 may display images with a standard dynamic range (e.g., images that exhibit a contrast ratio of about 1,000:1 between their brightest and darkest pixel luminance values) and/or may display images with a high dynamic range (e.g., images that exhibit a contrast ratio of about 10,000:1 or more between their brightest and darkest luminance values).

During operation, content generators in device 10 (e.g., operating system functions and/or applications running on control circuitry 12) may generate content for display on the pixel array of display 14. As an example, electronic device 10 may include one or more standard dynamic range (SDR) content generators and/or one or more high dynamic range (HDR) content generators (e.g., content generators that generate high dynamic range content in accordance with one or more different high dynamic range standards such as the HDR10 Media Profile standard, sometimes referred to as HDR10 and the Hybrid Log-Gamma standard, sometimes referred to as HLG). A luminance value mapping engine such as tone mapping engine 24 may be used to provide content generators with tone mapping parameters (sometimes referred to as luminance value mapping parameters) indicating how the content generators should map content luminance values to display luminance values and/or may be used to directly perform content-luminance-to-display-luminance mapping operations on content luminance values from the content generators. For example, tone mapping engine 24 may supply content generators with tone mapping parameters such as a black level, reference white level, specular white level, skin tone level, color gamut (e.g., the color primaries of the display to which content provider 24 maps the display content) and/or gamma and/or slope values to use in producing display luminance values for use in displaying images with pixels 36. Tone mapping engine 24 may be implemented using code running on control circuitry 12 of FIG. 1, control circuitry for device 10 such as display driver circuitry 26, and/or other control circuitry and/or may use hardwired features of the control circuitry in device 10.

Standard dynamic range content is often encoded in grey levels (e.g., values ranging from 0-255), where 0 corresponds to dark black and 255 corresponds to bright white. High dynamic range content is encoded in luminance levels for each pixel (generally to be displayed for standard viewing conditions such as dim viewing conditions). Device 10 may experience changes in ambient lighting conditions, user brightness settings may be adjusted up and down by a user, the content being displayed on display 14 may exhibit changes such as changes in average pixel luminance, and burn-in risk, and other conditions related to the presentation of content on display 14 may change over time. Device 10 may use tone mapping engine 24 to ensure that content is rendered appropriately for displaying on display 14 in view of these potentially changing conditions and other criteria such as the characteristics of display 14.

Figure 2:
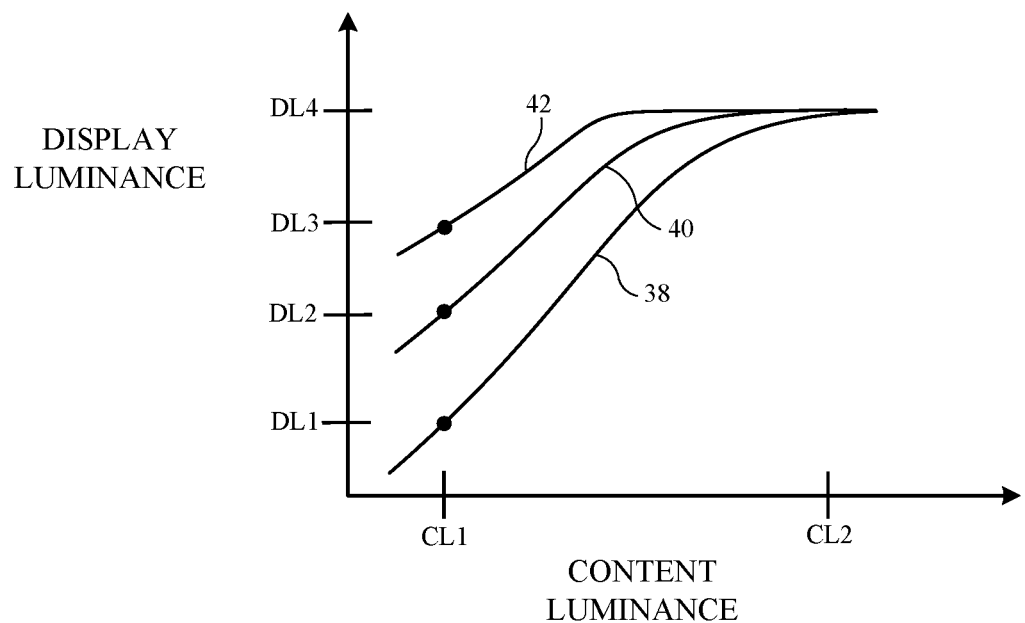
FIG. 2 is a graph showing how content luminance may be mapped to display luminance over a variety of user brightness settings in accordance with an embodiment.

FIG. 2 is a graph showing how content luminance values can be mapped to display luminance values in device 10 in accordance with three illustrative content-luminance-to-display-luminance mapping curves. The content luminance and display luminance axes of the graph of FIG. 2 (and the other luminance mapping graphs) have logarithmic scales. In the FIG. 2 example, a user is adjusting a display brightness setting for display 14 between three different levels (dim, moderate, and bright display brightness settings, respectively). A user may supply device 10 with a desired brightness setting (user-selected brightness level) by adjusting a touch screen display slider (e.g., a slider displayed on display 14) or using a button or other input-output device in circuitry 16. When a dim brightness setting level is selected, display 14 displays content in accordance with curve 38. When a moderate brightness setting level is selected, display 14 displays content in accordance with curve 40. The output of display 14 follows curve 42 in response to selection of a high brightness setting.

In each of these curves, low content luminance values are associated with black and high content luminance values are associated with white. At a given black content luminance level (e.g., BC1), curve 38 is associated with a display pixel luminance value of DL1 visible to the user for a content luminance value of CL1, curve 40 is associated with a display pixel luminance value of DL2 for content luminance CL1, and curve 42 is associated with a display pixel luminance value DL3 for content luminance CL1. The luminance level DL2 is brighter than luminance level DL1, because curve 40 is associated with a brighter set of output luminances from pixels 36 than curve 38. Similarly, luminance level DL3 is brighter than luminance level DL2 because curve 42 is associated with a brighter set of output luminances from pixels 36 than curve 40. White image pixels (e.g., pixels at content luminance level CL2) are all associated with the same display luminance level DL4 (e.g., the brightest output available from pixels 36 in display 14), so the mappings of curves 38, 40, and 42 will all produce a display luminance of DL4 for a content luminance of CL2.

Figure 3:
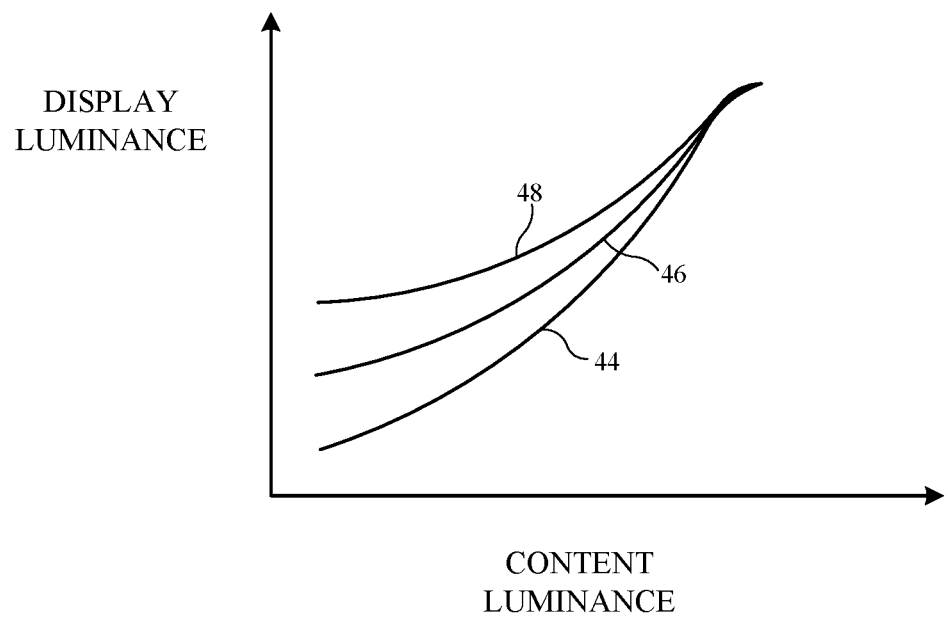
FIG. 3 is a graph showing how content luminance may be mapped to display luminance over a variety of ambient light conditions in accordance with an embodiment.

FIG. 3 is a graph showing how content luminance values can be mapped to display luminance values by device 10 in three different illustrative ambient light conditions. In the example of FIG. 3, curve 44 is associated with dim ambient light conditions (e.g., conditions corresponding to a dark indoors environment), curve 46 is associated with moderate ambient lighting conditions (e.g., a bright office or dim outdoors environment), and curve 48 is associated with bright ambient lighting conditions (e.g., a bright outdoors environment). Although similar to the curves of FIG. 2, the curves of FIG. 3 may be optimized for changes in ambient lighting conditions rather than user brightness settings. For example, whereas in dim lighting conditions curves 44 and 38 may be similar, ambient light glare may be present on display 14 under bright lighting conditions that tends to obscure black portions of the images on display 14. As a result, the curves of FIG. 3 (see, e.g., bright ambient light curve 48) may have somewhat elevated display luminance values at low content luminances to help overcome the ambient light glare, whereas this elevation in the output luminance for black content may not be present in scenarios in which a user has increased display brightness by selecting a curve such as curve 42 of FIG. 2.

In general, display characterization may involve user studies, modeling, and laboratory testing that helps establish desired tone mapping schemes for device 10 under a variety of operating conditions (e.g., user brightness settings, ambient light levels, and other operating conditions). Tone mapping may also account for the direction of ambient light, the viewing angle with which the user is viewing the display, properties of ambient light sources, properties of the display panel itself (e.g., reflectivity). This information may, for example, be used to estimate and compensate for display glare. These tone mapping schemes can then be implemented by tone mapping engine 24.

With one illustrative configuration, tone mapping engine 24 can select a desired tone mapping curve based on operating conditions such as display brightness settings (e.g., user defined brightness settings and brightness levels set by device 10 to accommodate a normal power operating mode and a low-power operating mode), ambient conditions (ambient light level and ambient light color), content statistics (e.g., information on average pixel luminance and burn-in risk or other information on operating conditions having a potential impact on display lifetime, quality information, dynamic range information etc.), and display characteristics (e.g., display limitations such as maximum achievable pixel luminance, power constraints (e.g., due to thermal limitations and/or other considerations), whether device 10 is operating on DC power (power from the battery in source 18 of device 10) or AC power, etc.

During operation, tone mapping engine 24 may obtain information on these operating conditions and may take suitable action to ensure that display 14 displays images satisfactorily. Tone mapping engine 24 may, as an example, remap content so that luminance values that are too high when output from a content generator are reduced by engine 24 before these values are used by display 14. In some situations, luminance values associated with specular highlights may, as an example, be clipped using a soft clipping arrangement to ensure that pixels 36 are not driven too strongly for display 14. Tone mapping engine 24 may also provide content generators such as content generators 20 and/or 22 with tone mapping parameters that inform the content generators of a desired content-luminance-to-display-luminance mapping curve to be used in displaying images on display 14.

Figure 4:
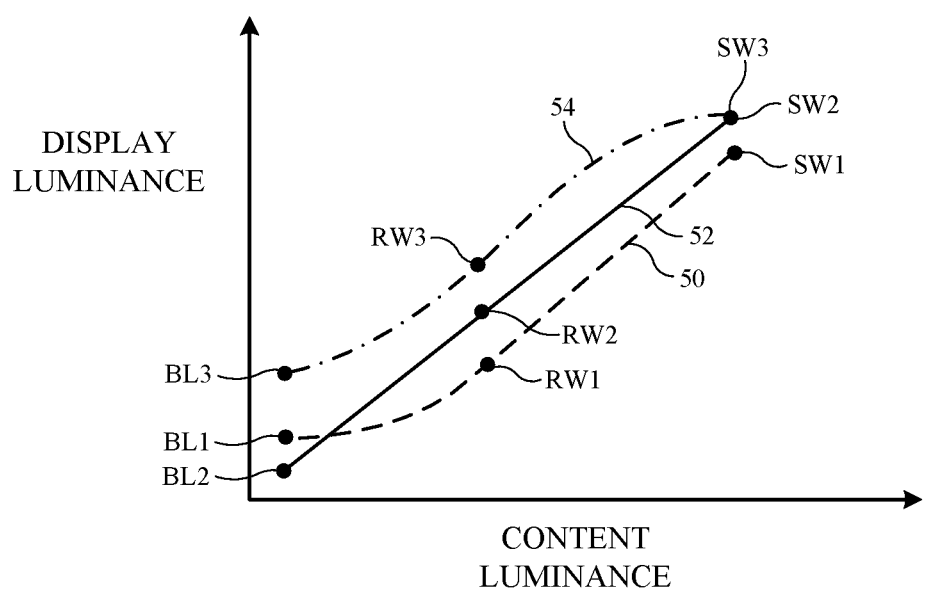
FIG. 4 is a graph showing how content-luminance-to-display-luminance relationships may be characterized by a black level, reference white level, and specular white level in accordance with an embodiment.

The use of tone mapping parameters to define content-luminance-to-display-luminance mapping curves is shown in FIG. 4. In the example of FIG. 4, there are three illustrative mapping curves: curve 50, 52, and 54. Each of these curves may be identified using a set of tone mapping parameters such as a black (BL), reference white level (RW), and specular white level (SW). During operation, engine 24 may supply content generators such as content generators 20 and/or 22 with suitable values of these tone mapping parameters, thereby informing content generators 20 and/or 22 whether to use curve 50, curve 52, or curve 54. If, for example, engine 24 supplies a content generator with tone mapping parameters BL1, RW1, and SW1, the content generator can generate display luminance values from content luminance values following curve 50. If, engine 24 supplies the content generator with tone mapping parameters BL2, RW2, and SW2, the content generator can generate display luminance values from content luminance values following curve 52. The content generator can generate display luminance values from content luminance values following curve 54 in response to tone mapping parameters BL3, RW3, and SW3 from engine 24. In this way, a set of tone mapping parameters (e.g., three or more tone-mapping parameters, 3-10 tone-mapping parameters, fewer than 5 tone-mapping parameters, etc.) can be used by engine 24 to specify a desired tone mapping relationship for the content generator to follow depending on current operating conditions. If a skin tone mapping parameter is used, its value may, as an example, lie between the reference white level and specular white level or between the reference white level and the black level and may represent skin tones common to human skin. Gamma and/or curve slope values may also be used as tone mapping parameters that specify a content-luminance-to-output-luminance mapping curve.

To take advantage of the larger dynamic range associated with content generated for display 14, display 14 may be backlit with an array of locally dimmable backlight elements. Locally dimmable backlight elements may be used to illuminate specular highlights while dimming dark portions of an image. A cross-sectional side view of display 14 backlit with an array of locally dimmable backlight elements is shown in FIG. 5.

Figure 5:
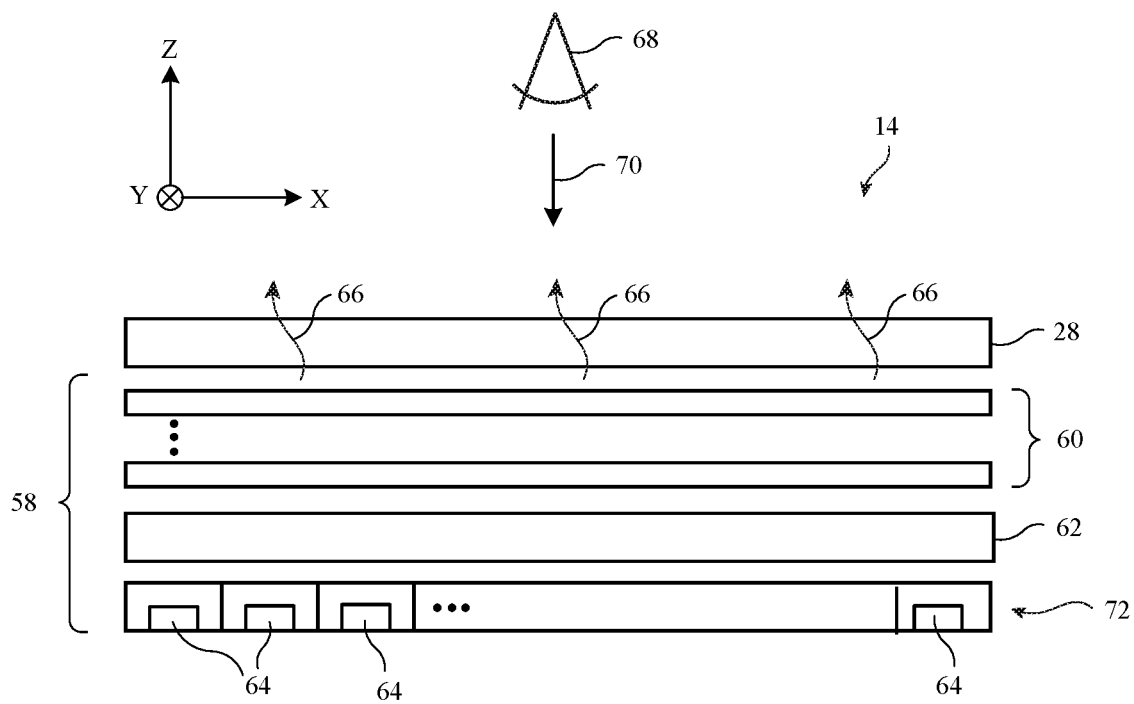
FIG. 5 is a cross-sectional side view of an illustrative display in accordance with an embodiment.

As shown in FIG. 5, display 14 may include a pixel array such as pixel array 28. Pixel array 28 may include an array of pixels such as pixels 36 of FIG. 1 (e.g., an array of pixels having rows and columns of pixels 36). Pixel array 28 may be formed from a liquid crystal display module (sometimes referred to as a liquid crystal display or liquid crystal layers) or other suitable pixel array structures. A liquid crystal display for forming pixel array 28 may, as an example, include upper and lower polarizers, a color filter layer and a thin-film transistor layer interposed between the upper and lower polarizers, and a layer of liquid crystal material interposed between the color filter layer and the thin-film transistor layer. Liquid crystal display structures of other types may be used in forming pixel array 28, if desired.

During operation of display 14, images may be displayed on pixel array 28. Backlight unit 58 (which may sometimes be referred to as a backlight, backlight layers, backlight structures, a backlight module, a backlight system, etc.) may be used in producing backlight illumination 66 that passes through pixel array 28. This illuminates any images on pixel array 28 for viewing by a viewer such as viewer 68 who is viewing display 14 in direction 70.

Backlight unit 58 may have optical films 60, a light diffuser such as light diffuser (light diffuser layer) 62, and light source array 72. Light source array 72 may contain a two-dimensional array of light sources 64. Each light source 64 may contain one or more light-emitting diodes. Light sources 64 may be arranged in an array with rows and columns in the X-Y plane of FIG. 5.

Light sources 64 in cells may be controlled in unison by control circuitry in device 10 (e.g., backlight control circuitry 56) or may be individually controlled (e.g., to implement a local dimming scheme that helps improve the dynamic range of images displayed on pixel array 28). The light produced by each cell light source 64 may travel upwardly along dimension Z through light diffuser 62 and optical films 60 before passing through pixel array 28. Light diffuser 62 may contain light-scattering structures that diffuse the light from light-emitting diode array 72 and thereby help provide uniform backlight illumination 66. Optical films 60 may, as an example, include films such as a dichroic filter, a phosphor layer, and films (e.g., brightness enhancement films that help to collimate light 66 and thereby enhance the brightness of display 14 for user 68, compensation films, and/or other optical films).

Figure 6:
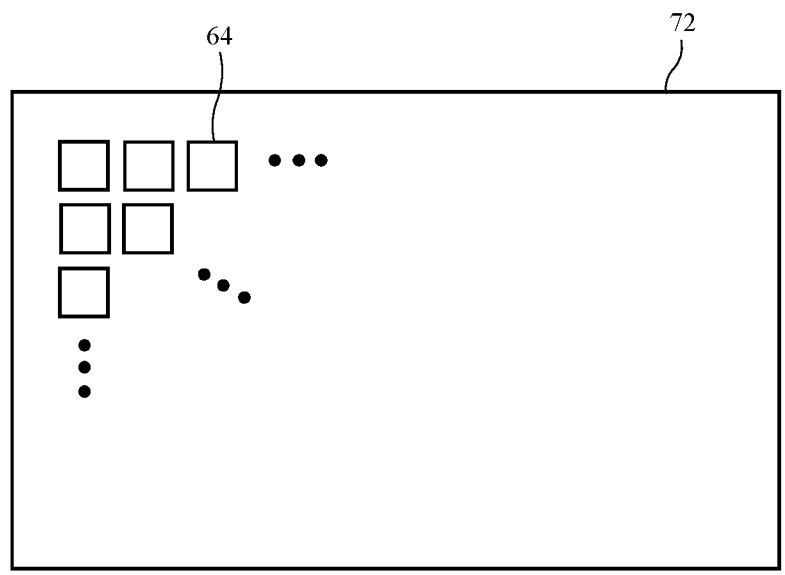
FIG. 6 is a top view of an illustrative backlight cell array having rows and columns of light source cells for a direct-lit backlight unit in accordance with an embodiment.

FIG. 6 is a top view of an illustrative light source array for backlight 58. As shown in FIG. 6, array 72 may contain row and columns of light sources 64. Each light source 64 may be associated with a respective cell. If desired, hexagonally tiled arrays and arrays with light sources 64 that are organized in other suitable array patterns may be used. The configuration of FIG. 6 in which array 72 has rows and columns of square light-emitting regions is merely illustrative. Each light source 64 may include a single light-emitting diode, a pair of light-emitting diodes, 2-10 light-emitting diodes, at least two light-emitting diodes, at least 4 light-emitting diodes, at least eight light-emitting diodes, fewer than five light-emitting diodes, or other suitable number of light-emitting diodes.

Each light source 64 in array 72 may be controlled individually (e.g., may be individually addressed), or light sources 64 may be controlled in blocks or zones, where all of the light-emitting diodes in the same zone receive the same control signal.

Light sources 64 may be controlled using an analog control scheme or a pulse-width-modulation (PWM) control scheme. In an analog control scheme, light output may be changed by adjusting the current level in the light source (e.g., by adjusting a DC control voltage across the light source or by adjusting a resistance of the light source). In a pulse-width-modulation control scheme, the current to the light source is turned on and off for short periods of time. The frequency of the on-off cycle may be faster than the human eye can detect to avoid a flickering effect. Light output in a pulse-width-modulation control scheme may be adjusted by varying the duty cycle of the constant current to the light source, which in turn adjusts the average current.

Figure 7:
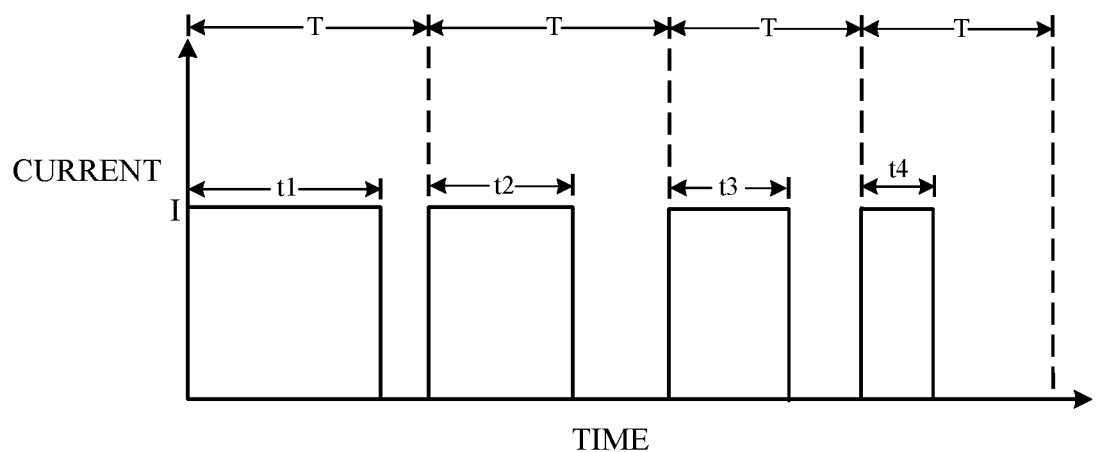
FIG. 7 is a graph showing a pulse-width-modulation dimming technique for controlling the brightness of a light source in a backlight in accordance with an embodiment.

FIG. 7 is a graph showing an illustrative pulse-width-modulation dimming scheme that may be used to control light sources 64. The duty cycle is the ratio of the pulse duration (t1, t2, t3, t4, etc.) to the signal period (T). The light source is cycled on and off at a desired frequency (e.g., 200 Hz, 150 Hz, greater than 200 Hz, less than 250 Hz, 18,000 Hz, less than or more than 18,000 Hz, or any other suitable frequency). The average current to the LED is the product of the total current and the duty cycle of the dimming function.

FIG. 7 shows four pulses, all operating at a constant current (I) but with different duty cycles to produce different average current levels. The first pulse produces a bright illumination with the longest pulse duration t1, the second pulse produces a less bright illumination at pulse duration t2 (which is less than t1), the third pulse produces even less bright illumination at pulse duration t3 (which is less than t2), and the fourth pulse produces dim illumination at pulse duration t4 (which is less than t3). The pulses of FIG. 7 are merely illustrative. In general, any suitable sequence of pulse durations, duty cycles, and current values may be used to produce the desired brightness from each light source 64. For example, a gradual dimming may be achieved by pulsing the light source multiple times at each duty cycle (e.g., 5-10 pulses at a 90% duty cycle, 5-10 pulses at a 50% duty cycle, 5-10 pulses at a 10% duty cycle, etc.).

Figure 8:
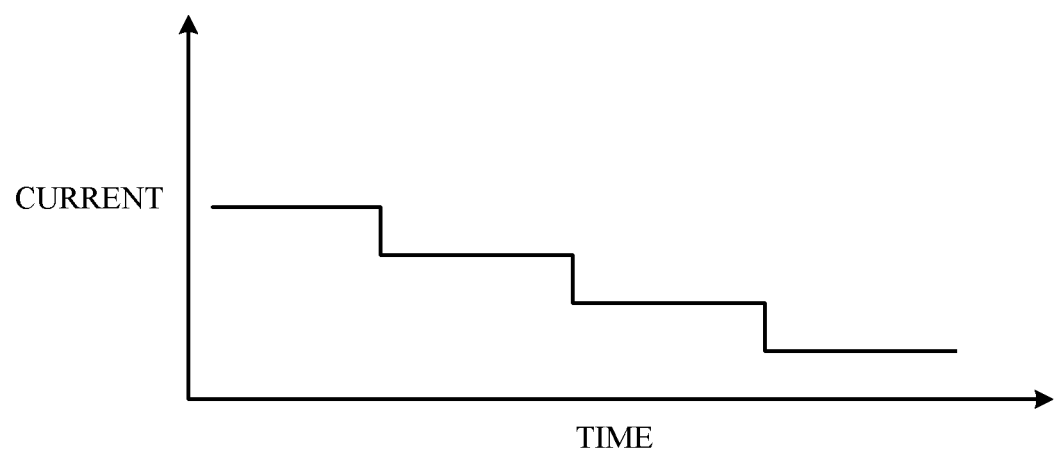
FIG. 8 is a graph showing an analog dimming scheme for controlling the brightness of a light source in a backlight in accordance with an embodiment.

FIG. 8 is a graph showing an illustrative analog dimming scheme that may be used to control light sources 64. In an analog dimming scheme, the light source is not cycled on and off. Rather, dimming is achieved by reducing the current level in the light source (e.g., by reducing the DC current to the light source or increasing a resistance of the light source).

Control circuitry 56 may control all of the light sources 64 using the same scheme (e.g., PWM dimming or analog dimming) or control circuitry 56 may control different light sources 64 using different schemes. For example, some light sources 64 in array 72 may be controlled using a PWM dimming scheme and other light sources 64 in array 72 may be controlled using an analog scheme.

It may be desirable to determine which control scheme to use for light sources 64 based on the desired brightness of light sources 64. Considerations such as chromaticity, luminance range, and power efficiency may give rise to one dimming scheme being more optimal than another in certain situations. As an example, higher luminance ranges may benefit from an analog dimming scheme, whereas lower luminance ranges may benefit from a PWM dimming scheme. This is, however, merely illustrative. If desired, a PWM dimming scheme may be used for higher luminance ranges and an analog dimming scheme may be used for lower luminance ranges. In other embodiments, the determination of whether to use a PWM or analog dimming scheme may be based on other factors (e.g., chromaticity, power constraints, ambient light, etc.). Arrangements in which an analog dimming scheme is used for higher luminance ranges and a PWM dimming scheme is used for lower luminance ranges is sometimes described herein as an example.

Figure 9:
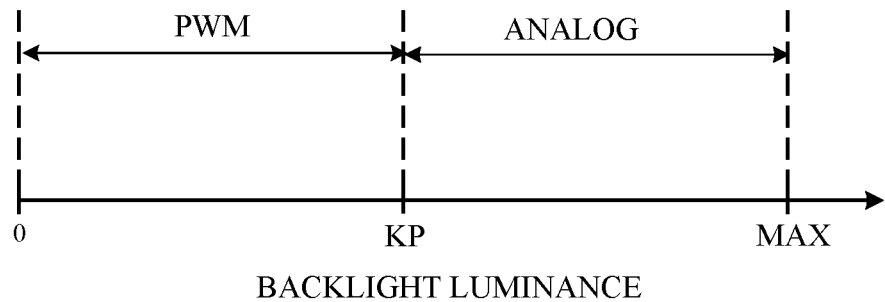
FIG. 9 is a graph showing how a light source in a backlight may be controlled using a pulse-width-modulation dimming scheme for brightness values below a knee point and using an analog dimming scheme for brightness values above the knee point in accordance with an embodiment.

FIG. 9 is a graph showing how a PWM dimming scheme may be used for luminance ranges below a threshold luminance value KP (sometimes referred to as a knee point) and an analog dimming scheme may be used above the threshold luminance value KP. Backlight control circuitry 56 may therefore determine which dimming scheme to use for light sources 64 based on the desired brightness of light sources 64. For example, if a brightness of 400 nits is desired from a given one of light sources 64, and the knee point is set to 300 nits, control circuitry 56 may send analog control signals to that light source 64. On the other hand, if a brightness of 200 nits is desired and the knee point is 300 nits, control circuitry 56 may send digital (e.g., PWM) control signals to that light source 64. Backlight brightness levels may be based on the desired brightness for a given pixel or set of pixels 36. For example, control circuitry 56 may dim light sources 64 that overlap dark pixels in an image while increasing the brightness of light sources 64 that overlap light pixels of an image.

The knee point KP may be a fixed value that is stored in device 10 or may be a dynamic value that changes during operation of device 10. For example, backlight control circuitry 56 may determine a knee point for backlight 58 based on a system brightness setting. System brightness settings may be user-defined brightness settings (as discussed in connection with FIG. 2), brightness levels set by device 10 to accommodate a normal power operating mode and a low-power operating mode, brightness settings to account for ambient conditions (ambient light level and ambient light color, as discussed in connection with FIG. 3), brightness levels based on a combination of these factors, and/or brightness settings based on other considerations.

Figure 10:
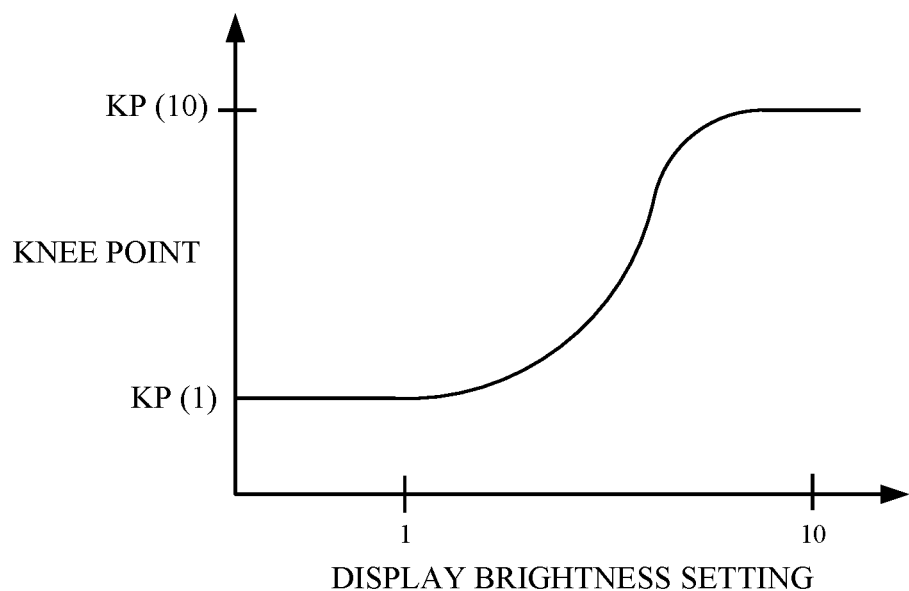
FIG. 10 is a graph showing how a knee point may be adjusted based on a display brightness setting in accordance with an embodiment.

FIG. 10 is a graph showing how a knee point may be changed based on the display brightness setting. For lower brightness settings such as brightness setting 1 (e.g., in dim ambient light and/or when a user slides a touch screen display slider to dim the display), the knee point may be relatively low at KP(1). For higher brightness settings such as brightness setting 10 (e.g., in bright ambient light and/or when a user slides a touch screen display slider to brighten the display), the knee point may be relatively high at KP(10).

As discussed in connection with FIG. 9, the knee point is a threshold luminance value that is used to determine whether light sources 64 are to be controlled using an analog control scheme or a digital control scheme (e.g., a PWM scheme). In one illustrative arrangement, analog control signals are used to produce backlight luminance values above the knee point, while PWM control signals are used to produce backlight luminance values below the knee point. For example, when the knee point is set to KP(1), control circuitry 56 may use PWM control signals for backlight luminance values below KP(1) and analog control signals for backlight luminance values above KP(1). When the knee point is set to KP(10), control circuitry 56 may use PWM control signals for backlight luminance values below KP(10) and analog control signals for backlight luminance values above KP(10).

Control circuitry 56 may determine a knee point for backlight 58 during operation of device 10 based on the current system brightness setting. If desired, the knee point may be calculated on-the-fly. For example, a function representing a curve of the type shown in FIG. 10 may be stored in electronic device 10 so that control circuitry 56 can calculate the desired knee point based on the current system brightness setting. In other arrangements, control circuitry 56 may use a look-up table to determine an appropriate knee point for backlight 58 based on the current system brightness setting.

FIG. 11 is an illustrative look-up table showing how different knee points may be used for different display brightness settings. A look-up table of the type shown in FIG. 11 may be stored in electronic device 10. Control circuitry 56 may use the look-up table to determine a knee point for backlight 58 during operation of display 14. As shown in FIG. 11, control circuitry 56 may use knee point KP(0) for a brightness setting of 0, knee point KP(1) for a brightness setting of 1, etc., up to a knee point KP(N) for a brightness setting of N (e.g., a maximum brightness setting for display 14).

In a PWM dimming scheme, the ratio of the highest luminance achievable by a light source to the lowest luminance achievable by a light source generally remains fixed (e.g., at 100:1 or other suitable ratio). When control circuitry 56 switches a light source from an analog dimming scheme to a PWM dimming scheme, the maximum luminance of the light source is equal to the knee point. As a result, the knee point determines the range of luminance values achievable by the light source. For example, for a light source with a 100:1 brightness ratio, a knee point of 500 nits may result in a brightness range of 500 nits to 5 nits, whereas a knee point of 50 nits may result in a brightness range of 50 nits to 0.5 nits. A smaller knee point results in a smaller range of brightness values, but it also results in a lower range of brightness values (and therefore a lower minimum brightness value) achievable by the light source.

Figure 12:
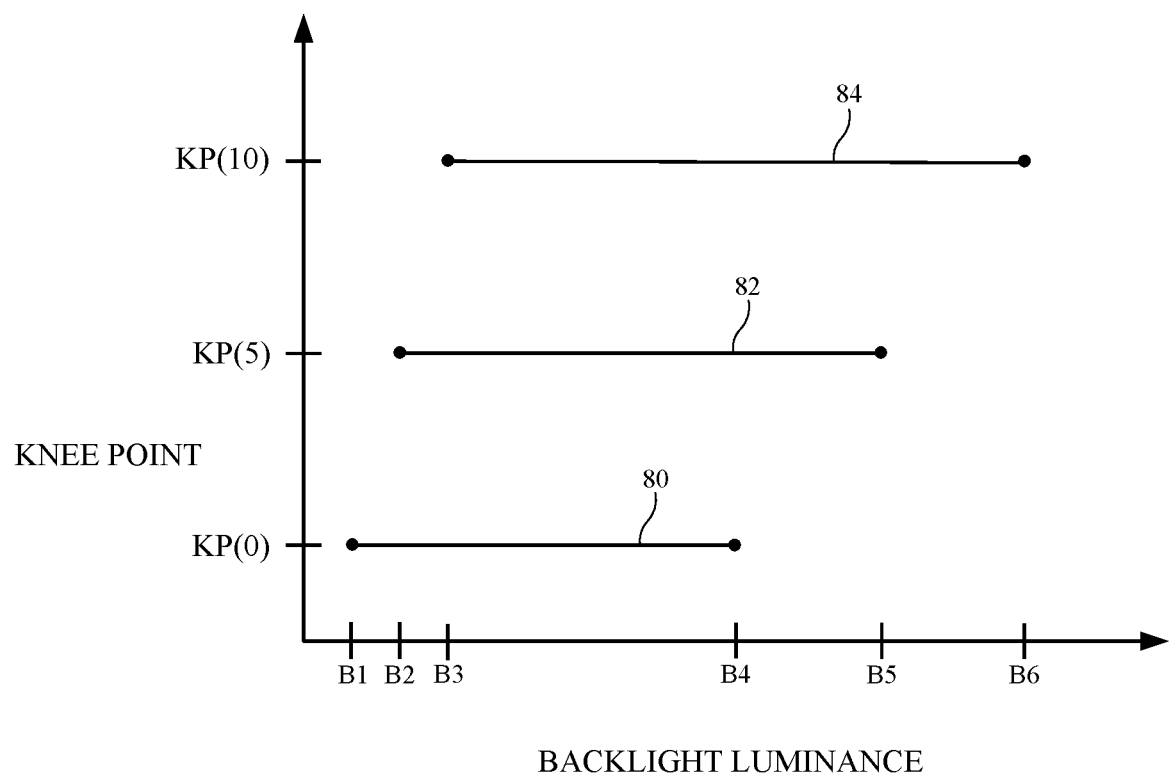
FIG. 12 is a graph showing how different knee points may result in different backlight dimming ranges in accordance with an embodiment.

FIG. 12 shows how different knee points may be used to achieve different luminance ranges (sometimes referred to as dimming ranges) from a light source in backlight 58. As shown in FIG. 12, a knee point value KP(0) at system brightness level 0 results in luminance range 80, which ranges from backlight luminance B1 to backlight luminance B4; a knee point value KP(5) at system brightness level 5 results in luminance range 82, which ranges from backlight luminance B2 to backlight luminance B5; and a knee point value KP(10) at system brightness level 10 results in luminance range 84, which ranges from backlight luminance B3 to backlight luminance B6. The lower the knee point, the lower the dimming range and the lower the minimum achievable luminance. Reducing the knee point for low system brightness levels may therefore allow display 14 to achieve even darker darks when display 14 is operated at low system brightness levels.

Control circuitry 56 may adjust the knee point of each individual light source 64 independently of other light sources 64 or control circuitry 56 may adjust the knee point of the entire array of light sources 64 collectively. Control circuitry 56 may reference a look-up table to determine what the knee point should be for light sources 64 based on the current system brightness setting, or control circuitry 56 may use other methods for determining the knee point for a given brightness setting (e.g., calculating a knee point value based on the system brightness setting or using other suitable methods to determine a knee point value).

Figure 13:
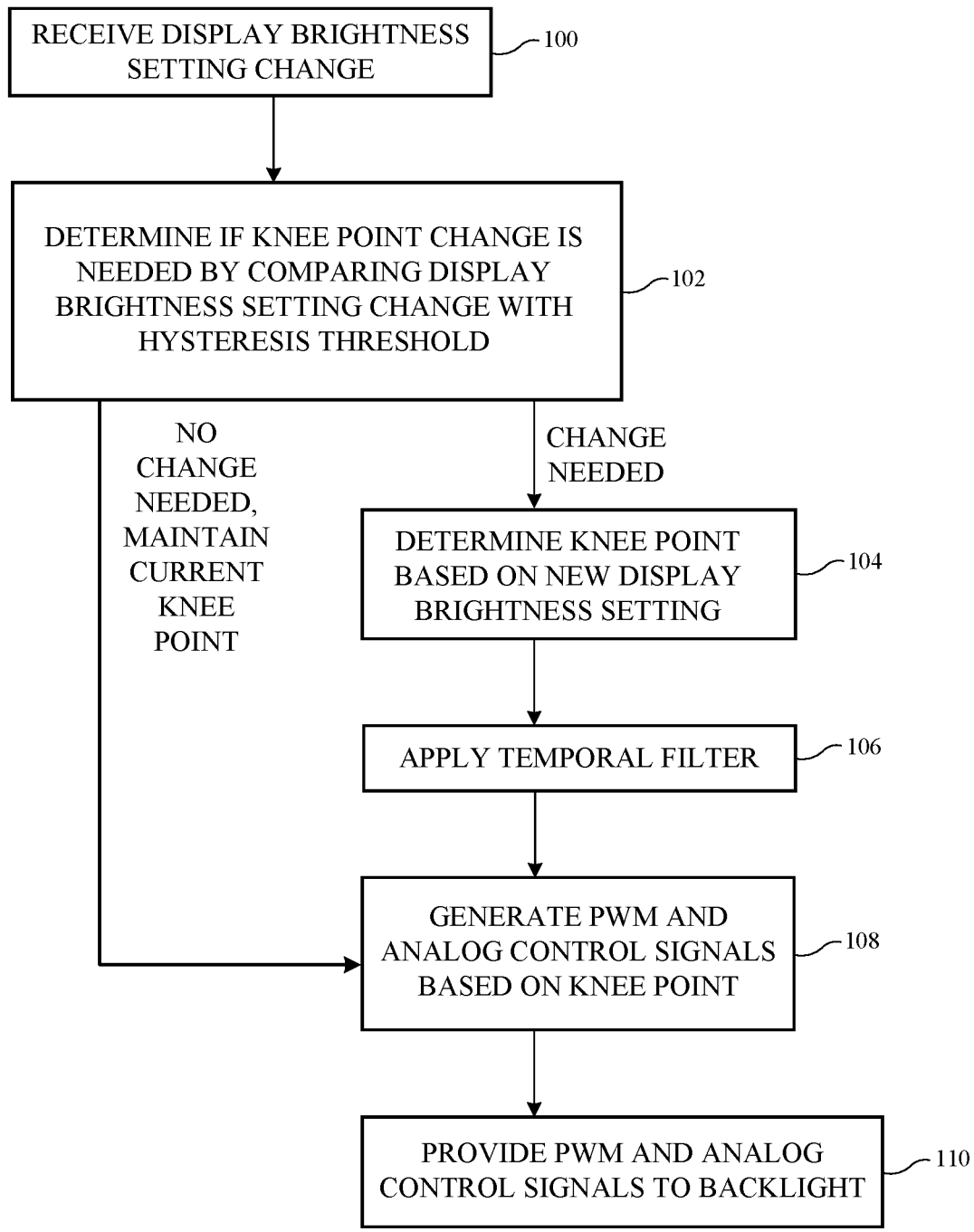
FIG. 13 is a flow chart of illustrative steps involved in operating a backlight using pulse width modulation and analog dimming schemes and a dynamic knee point in accordance with an embodiment.

FIG. 13 is a flow chart of illustrative steps involved in controlling backlight 58 using a dynamic knee point of the type described in connection with FIGS. 9, 10, 11, and 12.

At step 100, control circuitry 56 may receive information indicating a change in the system brightness setting. A system brightness setting may be a user-defined brightness setting (as discussed in connection with FIG. 2), a brightness level set by device 10 to accommodate a normal power operating mode and a low-power operating mode, a brightness setting to account for ambient conditions (ambient light level and ambient light color, as discussed in connection with FIG. 3), a brightness level based on a combination of these factors, and/or brightness settings based on other considerations.

Brightness settings may, for example, be represented by positive integers ranging from 0 to 20, 0 to 15, 0 to 30, 1 to 20, 1 to 15, 1 to 30, or any other suitable range of values. This is merely illustrative, however. In other arrangements, brightness settings may be represented by maximum and minimum brightness values, by an average brightness value, or by other suitable parameters.

In arrangements where brightness settings are represented by positive integers, a change in brightness setting may occur when the system brightness setting shifts from one integer value to a different integer value. For example a shift from level 0 to level 5 represents a +5 brightness change, a shift from level 2 to level 3 represents a +1 brightness change, a shift from level 15 to level 10 represents a −5 brightness change, etc.

At step 102, control circuitry 56 may determine if a change in knee point is needed by comparing the brightness setting change with a hysteresis threshold. This optional step may be used so that knee point changes do not occur when the brightness setting change is relatively small. Avoiding a knee point change for small brightness setting changes may help smooth knee point transitions so that harsh shifts in brightness are not perceivable to the user. For example, a hysteresis threshold of 2 would result in no knee point change for brightness setting changes of 2 levels or less, but would result in a knee point change if the brightness setting changes by 3 or more levels.

The hysteresis threshold may be programmable to different values (e.g., depending on a given operating mode of device 10 or display 14), may be eliminated (or disabled) so that any brightness setting change results in a new knee point, or may be fixed to a specific value that is stored in device 10. The hysteresis threshold may, if desired, be different for different brightness settings. For example, the hysteresis threshold may be based on the initial brightness setting and/or the final brightness setting associated with a brightness setting change (e.g., a shift from level 5 to level 4 brightness may be compared to a first hysteresis threshold, whereas a shift from level 13 to level 12 brightness may be compared to a second hysteresis threshold). If desired, the hysteresis threshold may be asymmetric so that increases in brightness settings are compared to a different hysteresis threshold than decreases in brightness settings. For example, a shift from level 13 brightness to level 14 brightness may be compared to a first hysteresis threshold, whereas a shift from level 13 brightness to level 12 brightness may be compared to a second hysteresis threshold that is either greater or less than the first hysteresis threshold. These examples are merely illustrative of different hysteresis thresholds that may be imposed to avoid unnecessary knee point changes for small shifts in the brightness setting.

If control circuitry 56 determines that a knee point change is needed (e.g., when the display brightness setting change is greater than the hysteresis threshold), processing may proceed to step 104.

At step 104, control circuitry 56 may determine a new knee point for backlight 58 based on the new display brightness setting. This may include, for example, calculating a new knee point using a function stored in device 10 (e.g., a function representing a curve of the type shown in FIG. 10), looking up a new knee point using a look-up table stored in device 10 (e.g., a look-up table of the type shown in FIG. 11), or using other suitable methods. As discussed in connection with FIG. 9, the knee point is a threshold luminance value that is used to determine whether light sources 64 are to be controlled using an analog control scheme or a digital control scheme (e.g., a PWM scheme). The knee point also controls the dimming range that is achievable under a PWM dimming scheme.

At optional step 106, a temporal filter may be applied so that the knee point gradually changes over a period of time to the desired new knee point. The speed at which the knee point changes may, if desired, depend on the absolute change in knee point. Control circuitry 56 may be configured to only allow a given number of updates per frame of display data (e.g., one update per frame, two updates per frame, one update for every two frames, etc.).

At step 108, control circuitry 56 may provide control signals to light sources 64 of backlight 58 using the appropriate knee point. If, for example, control circuitry determines in step 102 that no knee point change is needed, then control circuitry 56 may use the current unchanged knee point to generate control signals for backlight 58 in step 108. If instead a new point is determined in step 104, then control circuitry 56 may use the new knee point to generate control signals for backlight 58 in step 108.

As discussed in connection with FIG. 9, control circuitry 56 may use analog control signals to produce backlight brightness levels above the knee point and PWM control signals to produce backlight brightness levels below the knee point.

At step 110, control circuitry 56 may provide the PWM and/or analog control signals to light sources 64 of backlight 58. Light sources 64 that are to produce luminance values below the knee point may receive PWM control signals, whereas light sources 64 that are to produce luminance values above the knee point may receive analog control signals. The use of a dynamic knee point may allow for different dimming ranges (e.g., different ranges of backlight luminance values) to be achieved using a PWM scheme. For example, as shown in FIG. 12, lower minimum luminance values can be achieved when the knee point is reduced in a low brightness setting, making darks appear darker (e.g., less washed out) and increasing contrast when the display is operating at low brightness levels.

The foregoing is merely illustrative and various modifications can be made to the described embodiments. The foregoing embodiments may be implemented individually or in any combination.

What is claimed is:
1. An electronic device, comprising:
    a display having a backlight with at least one light source that generates light at a brightness level; and
    control circuitry configured to:
        operate the display according to a brightness setting;
        adjust a threshold brightness based on the brightness setting; and
        provide analog control signals to the light source when the brightness level is greater than the threshold brightness and pulse-width-modulation control signals to the light source when the brightness level is less than the threshold brightness.
2. The electronic device defined in claim 1 wherein the light source forms part of an array of light sources in the backlight.
3. The electronic device defined in claim 2 wherein the array of light sources comprises locally dimmable light sources.
4. The electronic device defined in claim 3 wherein the array of light sources comprises a two-dimensional array of light-emitting diodes.
5. The electronic device defined in claim 1 further comprising:
    an ambient light source that measures an ambient light level, wherein the brightness setting is based on the ambient light level.
6. The electronic device defined in claim 1 further comprising:
    an input device with which a user brightness setting is adjusted, wherein the brightness setting is based on the user brightness setting.
7. The electronic device defined in claim 6 wherein the input device comprises a touch sensor.
8. The electronic device defined in claim 1 wherein the control circuitry is further configured to:
    operate the display according to an updated brightness setting that is different from the brightness setting;
    determine an updated threshold brightness based on the updated brightness setting, wherein the updated threshold brightness is different from the threshold brightness; and
    provide analog control signals to the light source when the brightness level is greater than the updated threshold brightness and pulse-width-modulation control signals to the light source when the brightness level is less than the updated threshold brightness.
9. The electronic device defined in claim 8 wherein the control circuitry is configured to compare a difference between the updated brightness setting and the brightness setting to a hysteresis threshold, and wherein the control circuitry determines the updated threshold brightness when the difference is greater than the hysteresis threshold.
10. The electronic device defined in claim 8 wherein the control circuitry is configured to apply a temporal filter to gradually shift the threshold brightness to the updated threshold brightness.

11. A display, comprising:

an array of pixels;

an array of light sources that overlaps the array of pixels, wherein the light sources are locally dimmable and are each configured to produce light at different brightness levels; and control circuitry that operates the light sources using an analog dimming scheme for brightness levels above a threshold and a pulse-width-modulation dimming scheme for brightness levels below the threshold, wherein the threshold is adjustable.

12. The display defined in claim 11 wherein the control circuitry operates the display at a brightness setting and wherein the threshold is based on the brightness setting.

13. The display defined in claim 12 wherein the control circuitry adjusts the threshold when the brightness setting changes.

14. The display defined in claim 13 wherein the control circuitry uses a look-up table to adjust the threshold.

15. The display defined in claim 13 wherein the light sources comprise light-emitting diodes.

16. A method for operating a display having control circuitry and a backlight with an array of light sources, comprising:

with the control circuitry, operating the display according to a brightness setting;

with the control circuitry, providing analog control signals to the light sources in the backlight to produce luminance levels above a threshold;

with the control circuitry, providing pulse-width-modulation control signals to the light sources to produce luminance levels below the threshold; and with the control circuitry, adjusting the threshold in response to a change in the brightness setting.

17. The method defined in claim 16 further comprising:

comparing the change in the brightness setting with a hysteresis threshold, wherein adjusting the threshold in response to the change in the brightness setting comprises adjusting the threshold when the change in the brightness setting exceeds the hysteresis threshold.

18. The method defined in claim 16 further comprising, with the control circuitry, applying a temporal filter to gradually adjust the threshold in response to the change in the brightness setting.

19. The method defined in claim 16 wherein adjusting the threshold comprises reducing the threshold when the change in the brightness setting corresponds to a decrease in the brightness setting.

20. The method defined in claim 16 wherein adjusting the threshold comprises increasing the threshold when the change in the brightness setting corresponds to an increase in the brightness setting.

* * * * *